UNITED STATES PATENT OFFICE.

MARIA E. GROSSE, (FORMERLY MARIA E. KNELLES,) ADMINISTRATRIX OF CHARLES H. KNELLES, DECEASED, OF NEW YORK, N. Y., ASSIGNOR TO ANNA MARIA KNELLES, OF SAME PLACE.

ARTIFICIAL LEATHER.

SPECIFICATION forming part of Letters Patent No. 247,635, dated September 27, 1881.

Application filed August 3, 1881. (No specimens.)

*To all whom it may concern:*

Be it known that CHARLES H. KNELLES, deceased, late of the city, county, and State of New York, of whose estate MARIA EMILIE GROSSE (formerly MARIA E. KNELLES) is administratrix, invented new and useful Improvements in Artificial Leather, of which the following is a specification.

This invention has reference to a new and useful compound by which a tough and durable coating may be formed on the surface of cotton, linen, paper, or other fabrics, and which is plastic in its nature, and admits the impressing of ornamental designs into the surface. The fabrics coated with the improved compound are to be used in place of leather, india-rubber cloth, oiled and painted cloth, &c., and are intended for general application in the arts.

Plastic compounds composed essentially of glue and glycerine have been used for similar purposes heretofore; but they failed to give satisfactory results, owing to the large quantity of glycerine that had to be added to the glue, so as to render the latter pliable and tenacious, especially in cold weather. Another disadvantage of these compounds was that it required months to dry the fabrics so coated without becoming sufficiently permanent so as to obviate the effect of moist weather thereon, which made the coating soft and sticky, owing to the absorption of moisture by the glycerine. These disadvantages rendered the fabrics practically useless and prevented their general application.

The object of this invention is to furnish a composition in which the proportions of glue and glycerine are reduced, and these materials in part replaced by ingredients which render the coating pliable and durable without liability to crack or peel off, and by which the absorption of moisture at a low temperature is prevented.

The invention consists of a compound prepared of glue, mastic, dextrine, glycerine, chloride of iron, and chrome-alum, in the following manner and proportions: One pound of glue is dissolved in one pound of water and placed, together with six ounces of dextrine and six ounces of mastic that has been dissolved in alcohol, into a kettle having a water-jacket, so that the mass is not exposed to the direct heat of the fire. The mass is slowly heated, but prevented from boiling, as thereby its cohesive quality would be impaired. When melted to a homogeneous mass four and a half ounces of any desired pigment which has been ground up in nine ounces of glycerine, one ounce of chrome-alum dissolved in five ounces of glycerine, and one-eighth of an ounce of chloride of iron that is dissolved in eight ounces of water, are added, one after the other, to the mass, each being thoroughly incorporated therewith before the next ingredient is added. This compound is spread in a warm and liquid state on the fabrics to be coated and distributed thereon by suitable appliances, the thickness being regulated by an adjustable knife or "doctor," and the required design or pattern impressed by a suitable mold. The fabric can be removed about ten minutes after the coating is laid on, and is then hung up for drying.

The small quantity of glycerine employed renders the coating not liable to breakage in the winter, while the addition of chloride of iron accelerates the drying of the coating and preserves it in its dry state.

The mastic and dextrine are used as substitutes for a portion of the glue, and serve to render it more pliable and tenacious, they preventing also its getting moist and soft. The chrome-alum finally makes the coating, to a certain degree, water-tight, and prevents its softening by the influence of heat. Without the latter the fabrics could not be exposed to the sun, while with it, after having been thoroughly dried, the coating resists effectively the influence of the heat thereon. The result is a plastic compound of great durability and toughness, that may be extensively employed in the trades in place of leather or similar fabrics.

Having thus described the invention of said

CHARLES H. KNELLES, I claim as new and desire to secure by Letters Patent—

1. A plastic compound for coating fabrics to imitate leather, &c., consisting of glue, mastic, dextrine, glycerine, chloride of iron, chrome-alum, and a suitable pigment, prepared in the proportions substantially as and for the purpose set forth.

2. A fabric whose surface is covered with a compound composed of glue, mastic, dextrine, glycerine, chloride of iron, chrome-alum, and a suitable pigment, substantially as set forth.

MARIA E. GROSSE,
(Formerly MARIA E. KNELLES,)
*Administratrix of the estate of Charles H. Knelles, deceased.*

Witnesses:
PAUL GOEPEL,
CARL KARP.